Patented Dec. 18, 1934

1,984,423

UNITED STATES PATENT OFFICE 1,984,423

PHENOLIC CONDENSATION PRODUCT AND METHOD OF MAKING THE SAME

Emil E. Novotny, Philadelphia, Pa., assignor to John Stogdell Stokes, Spring Valley Farms, Pa.

No Drawing. Application July 23, 1927, Serial No. 208,066

7 Claims. (Cl. 260—4)

This invention relates to synthetic resins of the phenolic condensation type and to the plastics and varnishes made from these products and including preferably a relatively small percentage of an oxidizing agent in either gaseous, liquid or solid form.

The addition of suitable quantities of oxidizing agents to the plastic material or to the varnish prior to the molding operation results in the production of molded pieces of great brilliancy and at the same time maintains the molds or dies in a clean, polished condition, such condition improving with use.

Although most any oxidizing agent may be used in order to secure the peculiar technical effect I am after, it is found preferable, however, to use such oxidizing agents of either a neutral or weak basic tendency in preference to oxidizing agents of an acid-like nature. For example, I find that chlorine or products capable of liberating chlorine are quite desirable for my purpose, but this product may form hydrochloric acid injurious to unprotected steel or copper dies or plates.

Although a great number of substances are available, it might be mentioned that the following, by way of example, give excellent results—the oxides, such as manganese dioxide, lead oxide, etc.; the chromates, such as lead chromate, ammonium chromate, sodium chromate and ammonium dichromate; the permanganates, potassium or sodium permanganate. More specifically, however, for molding powders of the black or dark brown color, manganese dioxide is very well suited, whereas for the lighter brown materials lead oxide and lead chromate can be used. For varnishes, however, it is preferable to use a soluble variety as, for example, the ammonium dichromate or the potassium permanganate.

Plastics of the phenolic condensation type when molded from prepared powders or laminated sheets tend to stain the metal of the molds, necessitating frequent polishing of the steel or copper surfaces contacting with such materials. This staining is probably due to the reducing action of aldehydes or aldehyde derivatives, giving rise to side reactions of an undesirable nature. The use of oxidizing agents in the mass seems to prevent this action and results in keeping the molds and pressure plates bright and clean. The cure is very materially accelerated, the flow or plasticity is improved, and the molds and dies may be opened with less effort.

When molding ordinary phenolic condensation products at temperatures considerably above 300° F., the power factor is increased, making the product poor electrically especially where it is to be used as an insulator for high frequency circuits. With the oxidizing agent in situ, preferably in moderate amounts in order that it of itself may not affect the electrical properties, the product may be molded at high temperature with the electrical properties of the piece very materially improved, resulting in a low power factor and a low surface leakage, while at the same time permitting a quick cure because a high temperature may be used in the molding operation.

The observations made cover a long period of time and cover a diversity of phenolic condensation products under actual commercial operations. It has been found, for example, that the condensation products of phenol and formaldehyde, acetaldehyde, hexamethylenetetramine, furfural, furfur-alcohol, and various carbohydrates such as cellulose, sugars and starches behave very similarly in this respect and that in every case the presence of a small percentage of an oxidizing agent has a very marked technical effect as previously indicated.

In order that my invention may be better understood, it might be stated that where a molding powder is to be made from say a dry resin, the oxidizing agent such as, for example, the manganese dioxide, is caused to be intimately mixed with the resin and thereupon any other suitable filling agents are added together with necessary lubricants and colors. The product may now be processed in any of the usual ways, such as, for example, by being sheeted on differential rolls and being used in such sheets or subsequently ground to a powder. The material is molded in suitable dies preferably under the combined action of heat and pressure.

The process is not restricted to resins of the one stage type as products of the two stage type as, for example, condensation products of phenol and furfural having added thereto a hardening agent such as, say, furfural or hexamethylenetetramine, may have either dissolved or incorporated therewith a suitable amount of oxidizing agent sufficient for the purpose.

Where the material is to be impregnated into laminated sheets, it is, of course, best to either introduce the oxidizing agent into the paper pulp at the time it is made at the paper mill, or else to supply such material in the form of a soluble product in the varnish which is to be used for impregnation. For this purpose the ammonium dichromate is very well suited and a suitable percentage, based on the weight of the resin, is added to the varnish. The natural water remaining in either the condensation product or the alcohol when used as a solvent is sufficient to dissolve the small amount of oxidizing agent to be added.

Where the resin is to be used for purposes of incorporation at the beaters of the paper mill, it is most suitable to add such oxidizing agent to the reaction mass prior to the production of the resin in order that such material may be thoroughly incorporated in the molten resin mass.

A suitable percentage, therefore, of say the manganese dioxide or the lead chromate may be added to the digester contents before or after the resin has been formed and prior to the grinding of the resin. This ground resin is now ready for use at the paper mill and there will be no danger of losing the oxidizing agent from the batch. Manganese dioxide is very cheap and useful for this purpose, but on account of its great weight it could not ordinarily be carried in suspension in the paper mill furnish.

It will be found that the amount of oxidizing agent varies somewhat depending, of course, on the strength of the various materials used, but ordinarily for the usual run of resins the manganese dioxide may be added to the extent of say from ½ to 5%, the lead chromate to the extent of about 2% to 10%, and the ammonium dichromate to the extent of say ½% to 2% of the dry resin weight.

These percentages are given more by way of illustration as wide departures can be made in the proportion used and in the manner of introducing them without materially departing from the spirit of my invention.

What I claim is—

1. A composition of matter comprising a resinous phenol-aldehyde condensation product including manganese dioxide.

2. A potentially reactive phenol furfural resin including a hardening agent and manganese dioxide.

3. The herewith described method which consists in adding manganese dioxide to a potentially reactive phenol-aldehyde condensation product and subsequently heating said mass to convert the same to an infusible resinous body.

4. A composition of matter comprising a potentially reactive resinous phenol aldehyde condensation product including an oxidizing agent selected from the list consisting of manganese dioxide, ammonium chromate, ammonium dichromate, potassium permanganate and sodium permanganate.

5. A composition of matter comprising a potentially reactive resinous phenol aldehyde condensation product, a hardening agent, and an oxidizing agent to react with the resin during the final cure, said oxidizing agent comprising an agent selected from the list consisting of manganese dioxide, ammonium chromate, ammonium dichromate, potassium permanganate and sodium permanganate.

6. A composition of matter comprising a potentially reactive resinous phenol-aldehyde condensation product and ammonium dichromate.

7. A composition of matter comprising a potentially reactive resinous phenol-aldehyde condensation product and sodium permanganate.

EMIL E. NOVOTNY.